US009004606B2

(12) United States Patent
Bostrom et al.

(10) Patent No.: US 9,004,606 B2
(45) Date of Patent: Apr. 14, 2015

(54) EMERGENCY VEHICLE SEAT WITH INTEGRATED SEAT BELT AND HEIGHT ADJUSTABLE WEBBING GUIDE

(71) Applicant: H.O. Bostrom Company, Inc., Waukesha, WI (US)

(72) Inventors: Paul C. Bostrom, Hartland, WI (US); Matthew C. Horn, Elkorn, WI (US); Wayne R. Block, South Milwaukee, WI (US)

(73) Assignee: H.O. Bostrom Company, Inc., Waukesha, WI (US)

( * ) Notice: Subject to any disclaimer, the term of this patent is extended or adjusted under 35 U.S.C. 154(b) by 43 days.

(21) Appl. No.: 13/864,428

(22) Filed: Apr. 17, 2013

(65) Prior Publication Data
US 2014/0312677 A1    Oct. 23, 2014

(51) Int. Cl.
  *A47C 31/00* (2006.01)
  *B60R 22/26* (2006.01)
  *B60N 2/68* (2006.01)
  *B60N 2/24* (2006.01)
  *B60R 22/20* (2006.01)
  *B60R 22/18* (2006.01)

(52) U.S. Cl.
  CPC .............. *B60R 22/26* (2013.01); *B60N 2/688* (2013.01); *B60N 2/24* (2013.01); *B60R 22/20* (2013.01); *B60R 2022/1825* (2013.01); *B60R 2022/263* (2013.01)

(58) Field of Classification Search
  USPC ............. 297/464, 468, 475, 476, 480, 250.1; 280/801.2
  See application file for complete search history.

(56) References Cited

U.S. PATENT DOCUMENTS

| 4,508,363 | A | * | 4/1985 | Temple .......................... 297/468 |
| 4,597,607 | A | * | 7/1986 | Forkel et al. ................... 297/468 |
| 4,652,012 | A | * | 3/1987 | Biller et al. .................... 297/483 |
| 4,711,498 | A | * | 12/1987 | Adomeit ........................ 297/468 |
| 4,818,023 | A | * | 4/1989 | Griesemer ..................... 297/468 |
| 4,846,498 | A | * | 7/1989 | Fohl .............................. 297/468 |
| 4,872,704 | A |   | 10/1989 | Biller et al. |
| 5,088,794 | A |   | 2/1992 | Iwami et al. |
| 5,556,171 | A |   | 9/1996 | Busch |
| 5,566,978 | A | * | 10/1996 | Fleming et al. ............... 297/480 |
| 5,628,529 | A | * | 5/1997 | Golz et al. ................. 280/801.2 |
| 5,658,048 | A |   | 8/1997 | Nemoto |
| 5,722,731 | A |   | 3/1998 | Chang |
| 5,860,675 | A | * | 1/1999 | Muller et al. ................. 297/480 |

(Continued)

OTHER PUBLICATIONS

International Search Report and Written Opinion for corresponding application PCT/US2014/034273, having a mailing date of Jul. 28, 2014.

*Primary Examiner* — Jose V Chen
(74) *Attorney, Agent, or Firm* — Andrus Inellectual Property Law, LLP (57) ABSTRACT

An arrangement is provided for vertically adjusting a bezel and a bezel support defining a webbing guide for a seat belt webbing integrated into a vehicle seat. The adjustment arrangement includes a bearing block arrangement and a slotted latch plate mounted in a frame channel of the seat. A spring biased height adjustment frame extends from the bezel support and a spring biased release member is pivotally mounted within the bezel support and provided with a latching tooth engageable and disengageable with the latch plate for establishing various vertical positions of the bezel and the bezel support relative to an upper end of the frame channel.

19 Claims, 9 Drawing Sheets

(56) References Cited

U.S. PATENT DOCUMENTS

| | | | |
|---|---|---|---|
| 6,164,699 A * | 12/2000 | Paschek | 280/801.2 |
| 6,250,680 B1 | 6/2001 | Moker | |
| 6,491,346 B1 | 12/2002 | Gupta et al. | |
| 6,527,298 B2 * | 3/2003 | Kopetzky | 297/480 |
| 6,655,745 B2 | 12/2003 | Fohrenkamm et al. | |
| 6,688,700 B2 | 2/2004 | Gupta et al. | |
| 6,739,673 B2 | 5/2004 | Gupta et al. | |
| 6,786,551 B2 | 9/2004 | Brewer et al. | |
| 6,811,186 B1 | 11/2004 | Fraley et al. | |
| 6,938,623 B2 | 9/2005 | Graupner et al. | |
| 6,997,515 B2 | 2/2006 | Gupta et al. | |
| 7,128,373 B2 | 10/2006 | Kurtycz et al. | |
| 7,137,394 B2 | 11/2006 | Graupner et al. | |
| 7,234,763 B2 | 6/2007 | Gupta et al. | |
| 7,250,091 B2 | 7/2007 | Gupta et al. | |
| 7,300,102 B2 | 11/2007 | Gupta et al. | |
| 7,500,722 B2 | 3/2009 | Morris | |
| 7,735,934 B2 | 6/2010 | Fuhrken et al. | |
| 7,784,867 B2 * | 8/2010 | Lamparter | 297/468 |
| 7,901,003 B2 * | 3/2011 | Meeker et al. | 297/468 |
| 7,954,901 B2 | 6/2011 | Foye et al. | |
| 8,061,781 B2 | 11/2011 | Foye et al. | |
| 2009/0146487 A1 | 6/2009 | Becker et al. | |

\* cited by examiner

EMERGENCY VEHICLE SEAT WITH INTEGRATED SEAT BELT AND HEIGHT ADJUSTABLE WEBBING GUIDE

FIELD

The present disclosure relates generally to vehicle seat construction and, more particularly, pertains to a height adjustable webbing guide included in the integrated seat belt design of an emergency vehicle seat.

BACKGROUND

Seats of emergency vehicles, as with other passenger vehicles, are required to include some type of seat belt assembly which fits across the upper torso and lap of a at occupant flit helping to restrain the seat occupant in the event of a sudden stop or accident.

One such seat belt assembly is disclosed in U.S. Pat. No. 6,655,745 issued Dec. 2, 2003 and assigned to the assignee of the present application. The '745 patent discloses an emergency vehicle seat having a frame for supporting a seat cushion and a back cushioning arrangement as well as an enclosure connected to the frame for storing a self-contained breathing apparatus therein. The frame includes a pair of spaced apart, open upright side channels, each of the channels having a top end provided with a cage mounted thereon. One of the cages has a rotating bezel with a guide slot in communication with one of the channels. A seat belt webbing is connected to the frame and integrated into the seat. The seat belt webbing has an internal belt run protectively enclosed inside one of the channels, and an external belt run connected to the internal belt run and extending forwardly to exit from the guide slot for travel back across an occupant of the seat after which an outer end of the external belt run is latched into a buckle mounted on the seat. An inner end of the seat belt webbing is secured inside the bottom of the one channel to a spring biased retractor which, as is well known, normally allows unwinding of the seat belt, but locks automatically to prevent further unwinding upon deceleration of the seat during vehicle travel.

When using emergency vehicle seats with integrated seat belts, seat occupants have varying heights or waist lengths. Accordingly, it is desirable to provide an emergency vehicle seat with an integrated seat belt having a webbing guide which is adjustable for various heights of the seat occupant.

SUMMARY

The present disclosure relates to an adjustment arrangement for a seat belt webbing device mounted on an upper end of a frame member of a vehicle seat. The adjustment arrangement includes a webbing guide formed by a bezel mounted in a bezel support and disposed at the upper end of the frame member, and provided with a guide slot for guiding a seat belt webbing thereto. A bearing block arrangement is mounted to the frame member, and a latch plate is spaced from the bearing block arrangement and secured to the frame member. The latch plate is formed with a series of vertically spaced slots. A height adjustment frame extends downwardly from the webbing guide into the frame member. A release member is pivotally mounted to the webbing guide and is provided with a latching tooth which is selectively engageable and disengageable with one of the slots in the latching plate. A first spring is engaged with the release member for normally urging the tooth into latching engagement with the one slot in the latching plate for maintaining one vertical position of the webbing guide relative to the upper end of the frame member. A second spring having opposite ends is connected between the height adjustment frame at one end and the second end attached to a structure spaced away from the height adjustment frame for normally providing an upward force on the webbing guide.

Engagement of the release member against the bias of the first spring disengages the tooth from the one of the slots in the latch plate enabling the height adjustment frame, the release member, and the webbing guide to be moved to a second vertical position relative to the upper end of the frame member as defined by another one of the slots in the latch plate. Disengagement of the release member causes the tooth to engage the other one of the slots to maintain the second vertical position.

In a preferred embodiment, the frame member is a channel having a pair of opposed side walls joined by a rear wall. The bearing block assembly is adjustably mounted between the opposed side walls of the frame member. A webbing guide shroud is fixed to and extends from the upper end of the frame member. A guide roller is mounted in the bezel support, and a retractor is mounted on the frame member so that an upper end of the webbing, extends from the retractor over the guide roller and out the guide slot in the bezel. The bearing block arrangement includes a bearing block attached to a bearing block support provided with a first attachment point for the second spring.

The latch plate is secured to an inner surface of the rear wall. A height adjustment frame has an upper end depending from a mounting plate in the bezel support. The height adjustment frame has a lower end provided with a second attachment point for the second spring. The height adjustment frame is engageable against a rear surface of the bearing block. The release member includes a horizontally extending release handle integrally joined to a vertically extending leg provided at a lower end thereof with the latching tooth. The release handle is positioned beneath the bezel. Another retractor is mounted on a lower end of the vehicle seat, and is connected to a lower end of the webbing. The engagement of the release member pivots the release member such that the leg engages the height adjustable frame as the tooth is disengaged from the one of the slots in the latch plate.

The present disclosure further relates to a seat having a frame for supporting a seat cushion and a back cushioning arrangement. The frame includes a pair of spaced apart, upright channels, each of the channels having opposed side walls connected to a rear wall, at least one of the channels having a cage positioned thereon. The cage has a bezel with a guide slot mounted thereon for receiving and guiding an elongated seat belt webbing from a retractor mounted on the seat and across the back cushioning arrangement for connecting to the frame.

The seat is improved by an arrangement for vertically adjusting the bezel and the cage relative to an upper end of the one of the channels. The arrangement includes a bearing block arrangement mounted in the one of the channels, and a latch plate spaced from the bearing block arrangement and fixed in the one of the channels. The latch plate is formed with a series of vertically spaced apart slots defining different vertical adjustment positions for the bezel and the cage relative to the upper end of the one of the channels. A height adjustment frame extends downwardly from the cage. A release member is pivotally mounted within the cage and constructed with a latching tooth which is selectively engageable and disengageable with the one of the slots in the latch plate. A first spring is engaged with the release member for normally urging the tooth into latching engagement with the one of the slots in the latch plate to lock the cage and the bezel at a desired vertical position relative to the upper end of the one of the channels. A second spring has one end connected to the bearing block arrangement and another end secured to the height adjustment frame for normally providing an upward force on the cage and the bezel.

Moving the release handle upwardly against the bias of the first spring pivots the release handle and disengages the tooth from the one of the slots enabling the height adjustment frame, the release member, the cage and the bezel to be slit moved vertically as assisted by the upward force of the second spring to another position relative to the upper end of the one of channels as defined by another one of the slots in the latch plate. Releasing the release handle causes a return force of the first spring to pivot the release handle so that the tooth is urged back into latching engagement with the other of the slots in the latching plate thereby maintaining the vertical positioning of the cage and the bezel relative to the upper end of the one of the channels.

BRIEF DESCRIPTION OF THE DRAWINGS

The best mode of carrying out the disclosure is described herein with reference to the following drawing figures.

DETAILED DESCRIPTION

Referring now to the drawings, thereshown is an emergency vehicle seat 10 with an integrated seat belt structure 12 which has particular utility in fire and rescue vehicles. The seat 10 includes a frame 14 for supporting a base in the form of a seat cushion 16, and a back cushioning arrangement in the form of a removable seat back 18. The back cushioning arrangement includes a pair of side bolsters 20 and a pair of side cushions 22 removably mounted on the right and left sides of the seat 10 as more fully described in the aforementioned U.S. Pat. No. 6,655,745, For purposes of reference, the terms right and left side will be defined from the viewpoint of one occupying the seat 10.

Figure 3:
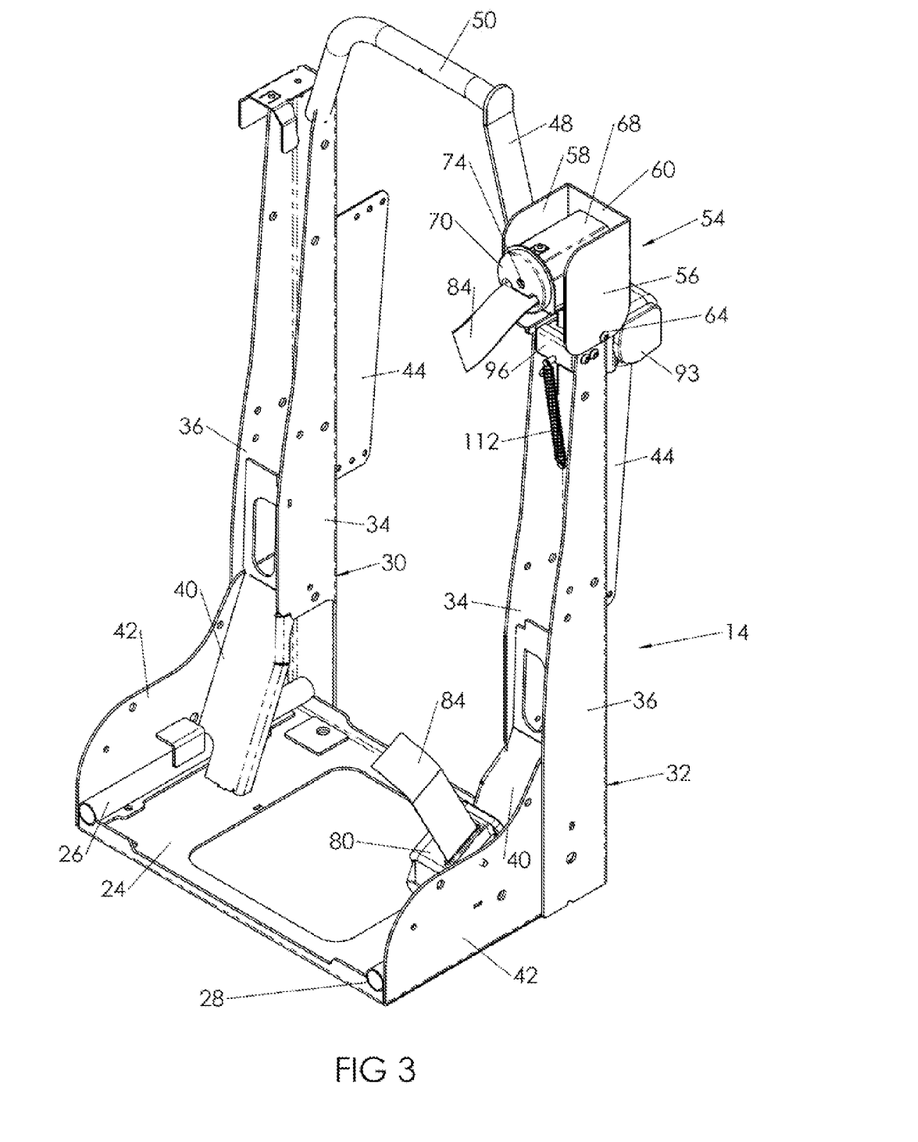
FIG. 3 is a front perspective view of a seat frame for the emergency vehicle seat showing the webbing guide in the lowered position.
Figure 4:
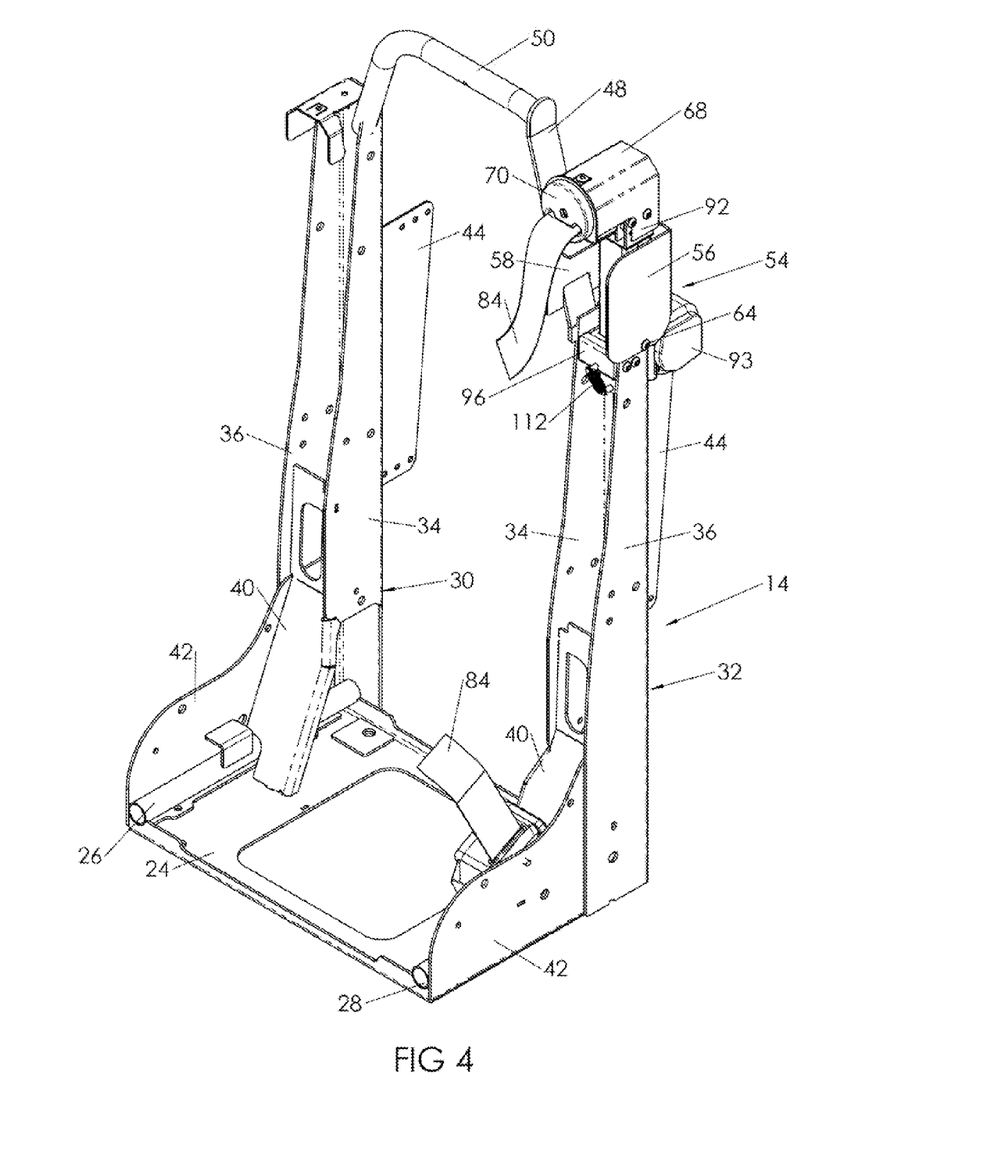
FIG. 4 is a view similar to FIG. 3 showing the webbing guide in the raised position.
Figure 7:
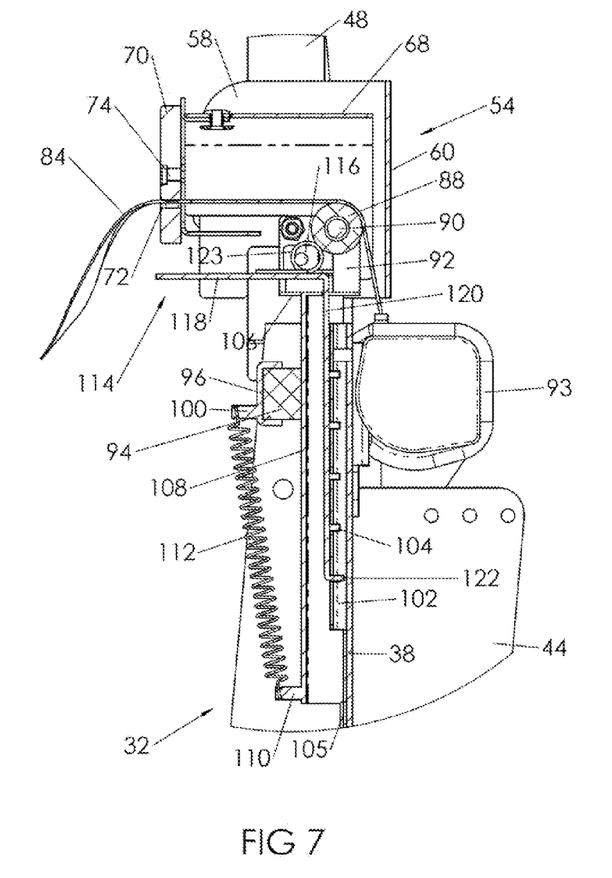
FIG. 7 is a sectional view of the seat frame showing the webbing guide held in the lowered position by a latching arrangement.
Figure 8:
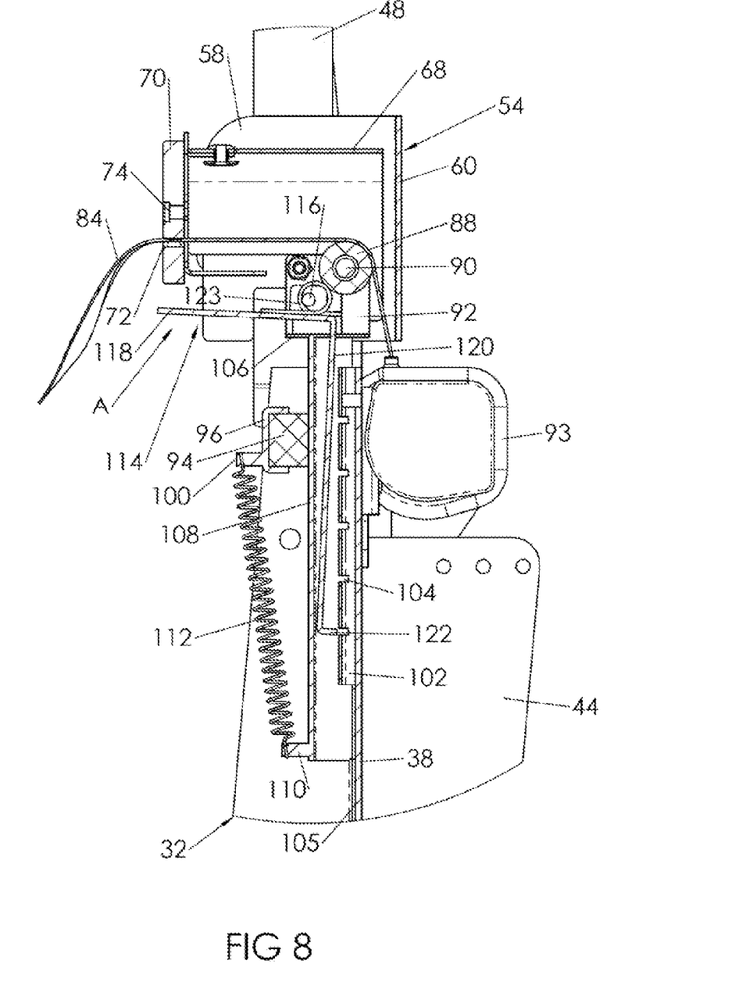
FIG. 8 is a view similar to FIG. 7 showing release or unlocking of the latching arrangement.
Figure 9:
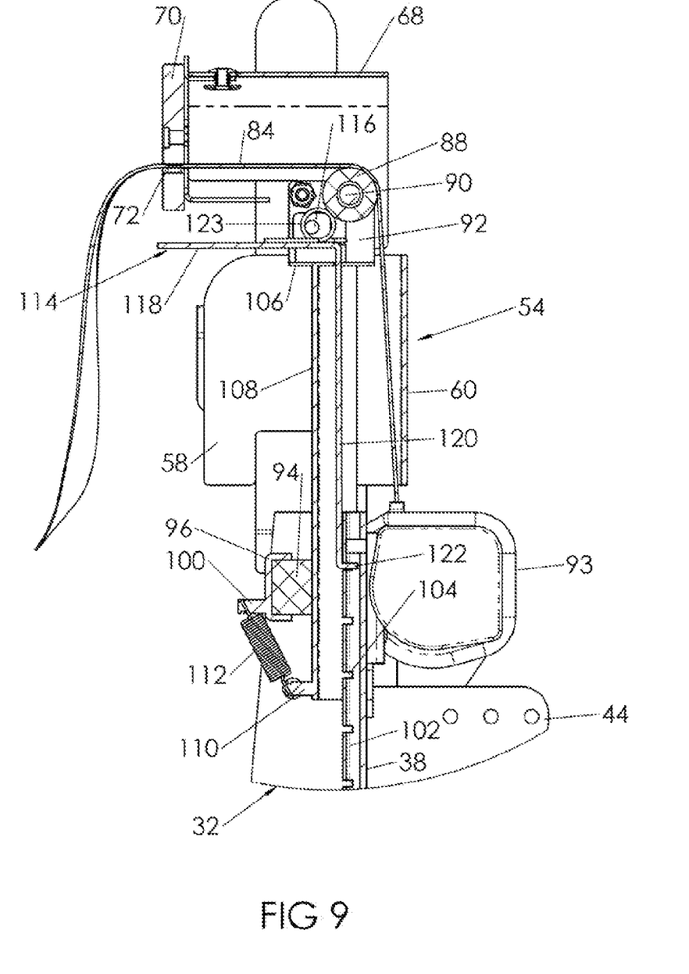
FIG. 9 is a view similar to FIG. 8 showing the webbing guide moved to and locked in the raised position by the latching arrangement.

Referring now to FIGS. 3 and 4, the frame 14 has a generally symmetrical construction including a mounting plate 24 having spaced apart seat tubes 26, 28 connected at the rearward ends to a pair of spaced apart, vertical ascending side channels 30, 32. Each of the frame channels 30, 32 is C-shaped in cross section so that each is open at a forward end thereof and faces the bolsters 20 and cushions 22. Each channel 30, 32 has a pair of inner and outer side walls 34, 36, respectively, interconnected by a rear wall 38 as seen in FIGS. 7-9. The lower end of each frame channel 30, 32 includes a downwardly and forwardly projecting bracket 40 which lies on an inside surface of a curved gusset 42 interconnecting and rigidifying the lower end of each channel 30, 32 and mounting plate 24.

Figure 1:
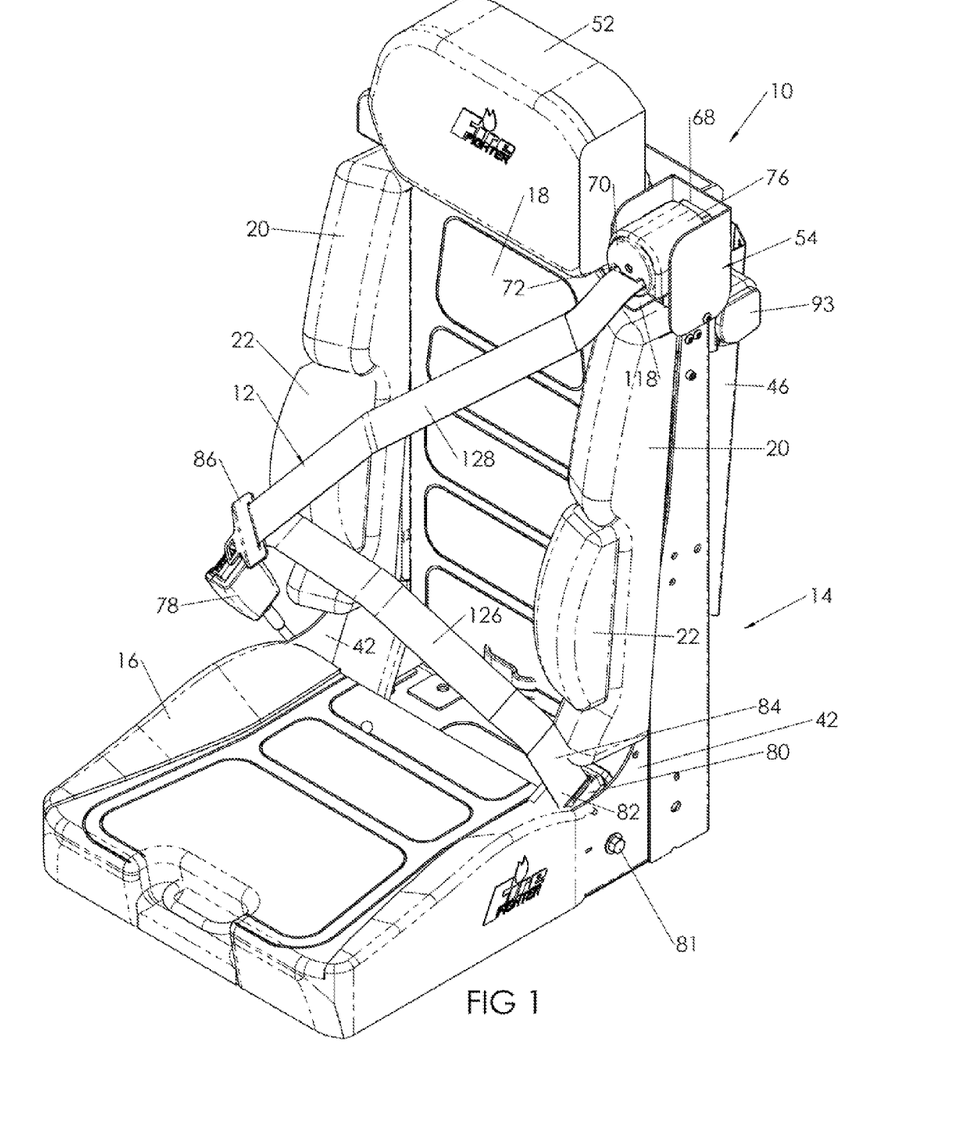
FIG. 1 is a front perspective view of an emergency vehicle seat with an integrated seat belt provided with an adjustable webbing guide shown in a lowered position.
Figure 2:
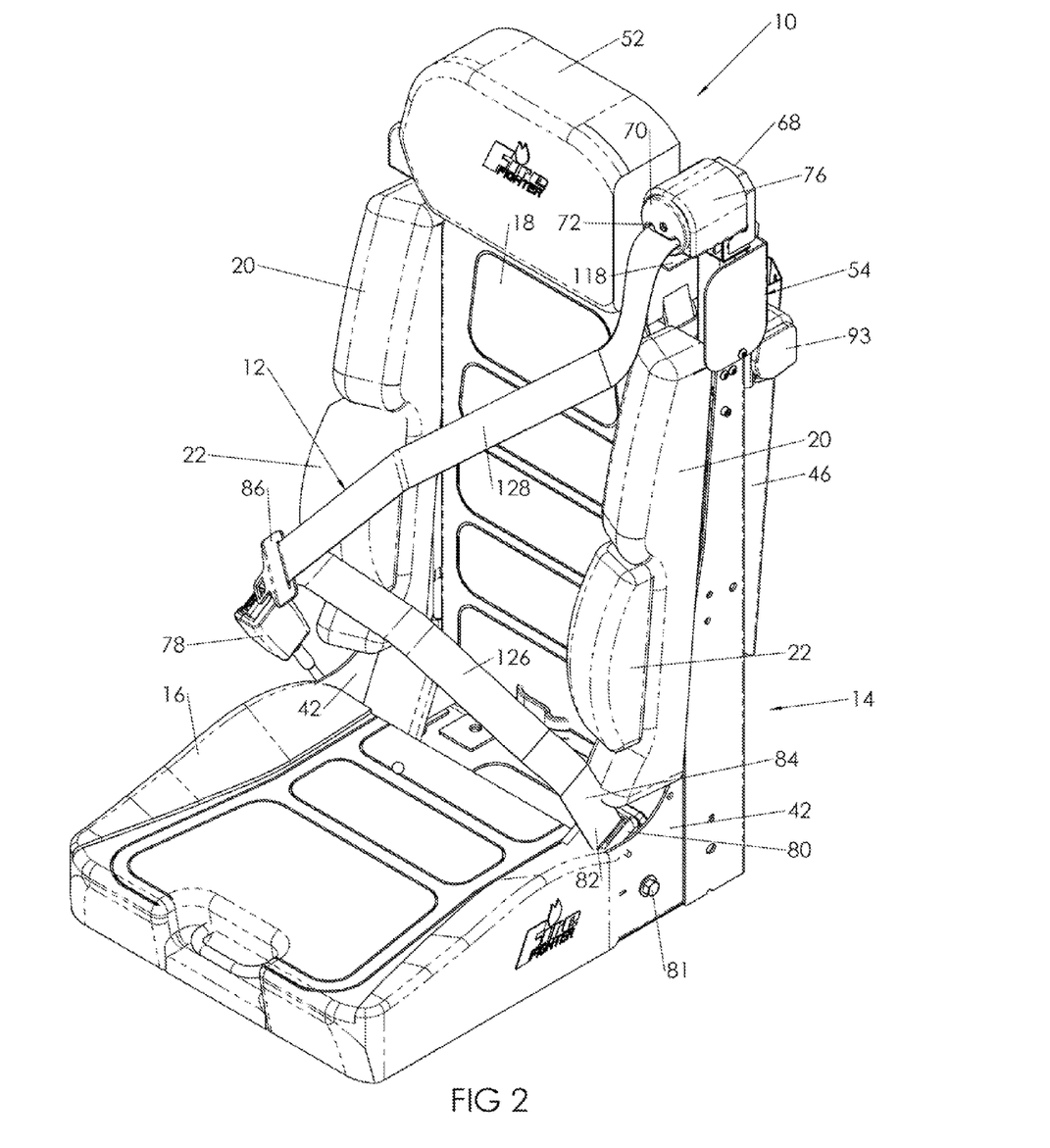
FIG. 2 is a view similar to FIG. 1 showing the webbing guide adjusted to a raised position.

Extending from the rear wall 38 of each channel 30, 32 is a seat shroud bracket 44 for supportably mounting a seat shroud 46 as seen in FIG. 1 and 2. As is well known, upon removal of the seat back 18, the seat shroud 46 provides a cavity for accommodating or storing the cylinder or tank of a self-contained breathing apparatus (SCBA) such as used in fire and rescue operations to provide oxygen. A head rest support brace 48 extends upwardly and inwardly from a top end of the channel 32, and is joined to a headrest tube 50 that is secured to top end of the other channel 30. A cushioned head pad 52 (FIGS. 1 and 2) is supported between the top ends of the channels 30, 32 by the headrest brace 48 and the headrest tube 50.

Figure 6:
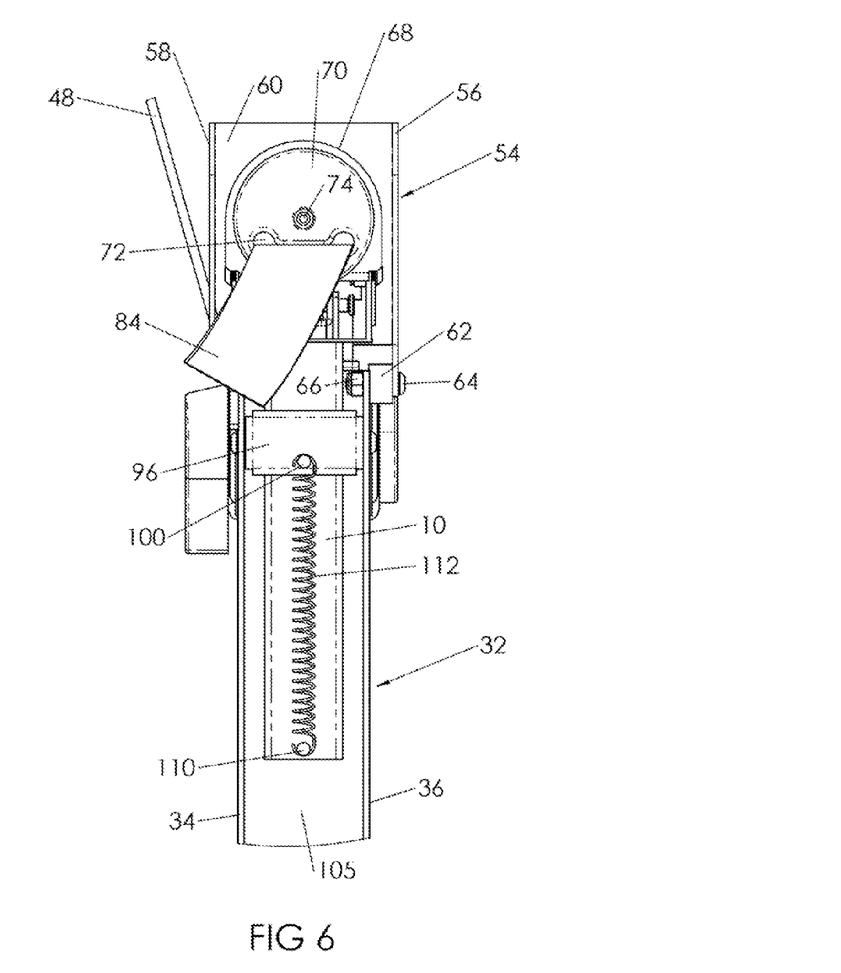
FIG. 6 is a front view of FIG. 5.

A C-shaped webbing guide shroud 54 is fixedly mounted to and effectively extends the top end of channel 32. As best seen in FIG. 6, the shroud 54 has an outer wall 56 and an inner wall 58 shorter than outer wall 56 connected by a rear wall 60A lower end of outer wall 56 is separated from the top end of channel wall 34 by a spacer 62, and connected to the outer wall 34 of channel 32 by a bolt 64 and a nut 66. A lower portion of the inner wall 58 is joined to the headrest support brace 48 which, in turn, is secured to the inner wall 34 of channel 32. Disposed within the shroud 54 is a bezel support or cage 68 having a bezel 70 with a webbing guide slot 72 rotatably mounted thereto about a pivot pin 74. A trim cover 76 (FIGS. 1 and 2) is positioned over and around the cage 68. As will be detailed hereafter, the cage 68 and the bezel 70 are adjustably mounted relative to the channel 32 and the shroud 54.

Referring further to FIGS. 1 and 3, the seat belt structure 12 includes a buckle 78 extending upwardly from the gusset 42 on the right side of the seat 1 lower retractor 80 is mounted by a fastener 81 inside the gusset 42 on the left side of the seat 10 for mounting a lower end 82 of an elongated flexible seat belt webbing 84. Alternatively, the lower end of the webbing 84 could be fixed to an anchor point on the left side of gusset 42. The webbing 84 from the lower retractor 80 passes through an elongated recess of a movable tongue 86 removably received and retained in buckle 78, and then extends upwardly through the guide slot 72 of the rotatable bezel 70. Thereafter, the webbing 84 passing through the guide slot 72 extends rearwardly, as shown in FIG. 7, over a guide roller 88 mounted for rotation about a guide roller shaft 90 extending across a lower rearward portion of the cage 68 defined by a pair of spaced apart cage side walls 92 (one being, seen in FIGS. 2, 4 and 7-9). The upper end of the webbing 84 then passes through a slot formed in the shroud 54, and is connected to a upper retractor 93 secured to an external surface of the rear wall 38. As is known, the upper and lower retractors 80, 93 normally allow unwinding of the webbing 84, but lock automatically to prevent further unwinding upon deceleration of the seat 10 during vehicle travel. The use of the upper and lower retractors 80, 93 in the seat 10 provides a larger retractive force for rewinding the webbing 84, and provides a greater amount of webbing 84 which is particularly useful when emergency vehicle seat occupants are wearing protective apparel that increases their torso size.

In accordance with the present disclosure, the cage 68 and the bezel 70 rotatably mounted therein define a webbing guide which is mounted for vertical adjustment relative to the shroud 54 and the upper end of channel 32 between a lowered position (FIGS. 1, 3, 5, 6, 7, 8) and a raised position (FIGS. 2, 4 and 9). The webbing guide is adjusted as desired to accommodate for different waist lengths or heights of seat occupants.

Referring now to FIGS. 5-9, a bearing block 94 having a forward facing support 96 is mounted by fasteners 98 between the inner surfaces of the upper ends of channel side walls 34, 36. Bearing block support 96 is provided with an outwardly projecting attachment member 100. A latch plate 102 is fixed along an inner surface of the rear wall 38 of channel 32, and is formed with a series of horizontally extending slots 104 which are vertically spaced apart from each other. In the embodiments of FIGS. 7-9, the latch plate 102 is formed with five slots 104 defining vertical adjustment heights for the bezel 70 and the cage 68 forming the webbing guide. However, it can be appreciated that any number of slots 104 can be formed in the latch plate 102 as desired. A bearing plate 105 is provided along the inner surface of channel rear wall 38.

Figure 5:
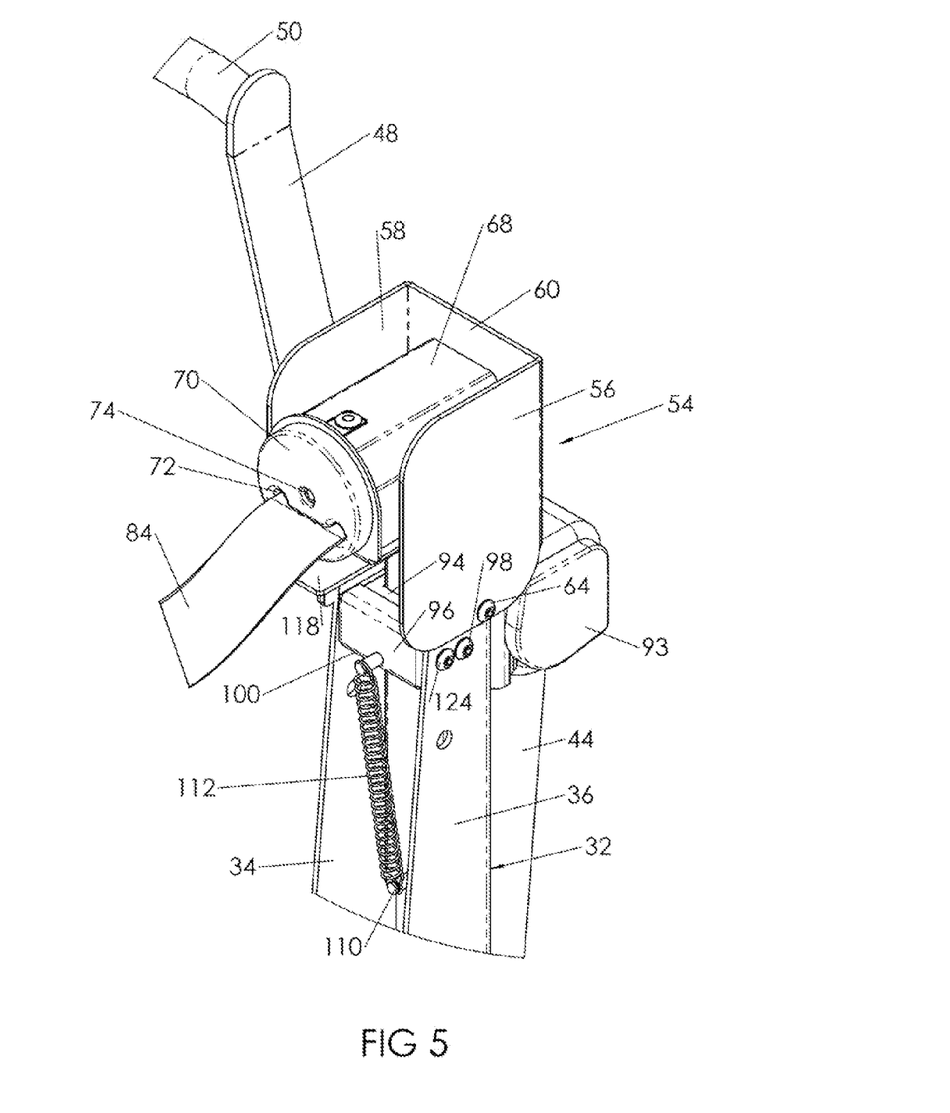
FIG. 5 is an enlarged detail view of the seat frame with the webbing guide in the lowered position.

Extending downwardly from a mounting plate 106 at the lower rearward portion of cage 68 is an elongated height adjustment frame 108 which extends down into the frame member 32, and is provided with an outwardly projecting attachment member 110 at a lower end thereof. A counterbalancing spring 112 has one end connected to the upper attachment member 100, and another end connected to the lower attachment member 110 to normally bias the height adjustment frame 108 upward. The height adjustment frame 108 is designed to slidably move up and down against the bias of the spring 112 and bear against a rearward surface of bearing block 94. A generally L-shaped release member 114 is pivotally mounted within the lower rearward portion of the cage 68 on a pivot pin 116. The release member 114 includes a horizontally extending release handle 118 joined at a substantially 90° angle to a vertically depending leg 120 having an inwardly extending latch tooth 122 at the bottom end thereof. The latch tooth 122 is selectively engageable and disengageable with one of the slots 104 formed in the latch plate 102 to maintain a desired vertical position of the web guide 68, 70 relative to the shroud 54 which is fixed on the channel 32. The release member 114 is engaged with a spring 123, and biased to normally urge the tooth 122 into latching or locking engagement with one of the slots 104 in the latch plate 102. As seen in FIG. 5, slotted holes 124 are formed in the channel side walls 34, 36 through which the fasteners 98 pass to allow horizontal adjustment of the bearing block 94 and the bearing block support 96 to adjust adequate clearance for the height adjustment frame 108.

Although the preferred embodiment shows the seat belt webbing 84 routed through a webbing guide on the left side frame channel 32, it should be understood that the disclosure also contemplates a similar webbing guide design using, the right side frame channel 30.

In the lowered position shown in FIGS. 1 and 7, the webbing guide 68, 70 is substantially maintained within the shroud 54 by the latched engagement of the tooth 122 with the walls forming the lowermost slot 104 of the latch plate 102. To use the seat belt structure 12, a seat occupant having a shoulder height below the guide slot 72 takes the tongue 86 adjacent the guide slot 72 and pulls it across his torso to insert the tongue 86 into the buckle 78. This movement causes the webbing 84 to unwind from the retractors 80, 93 so that the webbing 84 defines a lap belt portion 126 traversing the lap of the seat occupant, and a shoulder belt portion 128 extending diagonally across the upper torso of the seat occupant.

In the event a seat occupant has an increased waist length or shoulder height which is above the guide slot 72, the seat occupant manually applies an upward force on the release handle 118 in the direction of arrow A in FIG. 8. Such upward force initially causes release member 114 to be pivoted about pin 116 and simultaneously causes the lower end of leg 120 to engage height adjustment franc 108 and the tooth 122 to be disengaged or unlatched from the lowermost slot 104 in the latch plate 102. At this point, further upward force on the release handle 118 results in upward sliding movement of the height adjustment frame 108 assisted by the force of spring 112 along the bearing block 94 as well as upward movement of the release member 114 and the webbing guide 68, 70 connected with the height adjustment frame 108 and the release member 114 relative to the shroud 54.

Once the webbing guide 68, 70 has reached a desired height such as the uppermost height position shown in FIG. 9, the release handle 118 is released so that the tooth 122 assisted by the release force of the spring 123 will engage in the walls defining, in this case, the uppermost slot 104 in latch plate 102. In the position shown in FIG. 9, the height adjustment 108 bears against the bearing block 94 and stabilizes the cage 68 and the bezel 70 supported therefrom. With the web guide 68, 70 locked in this raised position, the seat occupant can comfortably apply the seat belt structure 12 about his torso and lap as described above.

With the above described construction, it should be appreciated that the present disclosure provides a vertical adjustment arrangement for a webbing guide on a vehicle seat 10 so that the webbing 84 can be drawn at different angles relative to the shoulders of seat occupants of varying heights to provide a smooth application of the webbing across the upper torso of the seat occupant. It should also be appreciated that in use, the bolsters 20 and the side cushions 22 conceal the various operating components of the adjustment arrangement in the channel 32.

Various alternatives are contemplated as being within the scope of the following claims particularly pointing out and distinctly claiming the subject matter regarded as the invention.

What is claimed is:

1. An adjustment arrangement for a seat belt webbing device mounted on an upper end of a frame member of a vehicle seat, the adjustment arrangement comprising:
   a webbing guide disposed at the upper end of the flame member, and provided with a guide slot for guiding a seat belt webbing therethrough;
   a bearing block arrangement mounted to the frame member;
   a latch plate spaced from the bearing block arrangement and secured to the flame member, the latch plate being with formed a series of vertically spaced slots;
   a height adjustment frame extending downwardly from the webbing guide into the frame member;
   a release member movably mounted to the webbing guide, and provided with a latching tooth which is selectively engageable and disengageable with one of the slots in the latching plate; and
   a first spring engaged with and biased against the release member for normally urging the tooth into latching engagement with the one slot in the latching plate for maintaining one vertical position of the webbing guide relative to the upper end of the frame member,
   wherein application of a force on the release member against the bias of the first spring moves the release member relative to the webbing guide to move the tooth away from the latch plate and to disengages the tooth from the one of the slots in the latch plate enabling the height adjustment frame, the release member, and the webbing guide to be moved to a second vertical position relative to the upper end of the frame member as defined by another one of the slots in the latch plate, and wherein release of the force on the release member causes the tooth by means of the first spring to engage the other one of the slots to maintain the second vertical position.

2. The adjustment arrangement of claim 1, including a second spring having opposite ends connected between the height adjustment frame at one end and a second end attached to a structure spaced away from the height adjustment frame for normally providing an upward force on the webbing guide.

3. The adjustment arrangement of claim 2, wherein the bearing block arrangement includes a bearing block attached to a bearing block support provided with a first attachment point for the second spring.

4. The adjustment arrangement of claim 2, wherein the height adjustment frame has a lower end provided with a second attachment point for the second spring.

5. The adjustment arrangement of claim 1, wherein the frame member is a channel having a pair of opposed side walls joined by a rear wall.

6. The adjustment arrangement of claim 5, wherein the bearing block arrangement is adjustably mounted between the opposed side walls of the frame member.

7. The adjustment arrangement of claim 5, wherein the latch plate is secured to an inner surface of the rear wall.

8. The adjustment arrangement of claim 1, wherein a webbing guide shroud is fixed to and extends from the upper end of the frame member.

9. The adjustment arrangement of claim 1, wherein a guide roller is mounted in the webbing guide, and a retractor is mounted on the frame member so that an upper end of the webbing extends from the retractor over the guide roller and out the guide slot in the webbing guide.

10. The adjustment arrangement of claim 1, wherein the height adjustment frame has an upper end depending from a mounting plate in the webbing guide.

11. The adjustment arrangement of claim 1, wherein the height adjustment frame is engageable against a rear surface of the bearing block arrangement.

12. The adjustment arrangement of claim 11, wherein the release handle is positioned beneath the webbing guide.

13. The adjustment arrangement of claim 11, wherein the engagement of a release member pivots the release member such that the leg engages the height adjustment frame as the tooth is disengaged from the one of the slots in the latch plate.

14. The adjustment arrangement of claim 1, wherein the release member includes a horizontally extending release handle integrally joined to a vertically extending leg provided at a lower end thereof with the latching tooth.

15. The adjustment arrangement of claim 1, wherein another retractor is mounted on a lower end of the vehicle seat, and is connected to a lower end of the webbing.

16. The adjustment arrangement of claim 1, wherein the seat belt webbing is secured at both ends to a frame member with at least one end being routed through a spring biased retractor.

17. The adjustment arrangement of claim 1, wherein the webbing guide is defined by a bezel mounted to a bezel support.

18. In a seat having a frame for supporting a seat cushion and a back cushioning amingement, the frame including a pair of spaced apart, upright channels, each of the channels having opposed side walls connected by a rear wall, at least one of the channels having a cage positioned thereon, the cage having a bezel with a guide slot mounted thereon for receiving and guiding an elongated seat belt webbing from a retractor mounted on the seat and across the back cushioning arrangement for connecting to the frame, the improvement comprising:
  an arrangement for vertically adjusting the bezel and the cage relative to an upper end of the one of the channels so that the seat belt webbing can be drawn at different angles through the guide slot relative to the shoulders of seat occupants of varying heights, the arrangement including;
  a bearing block arrangement mounted in the one of the channels;
  the latch plate spaced from the bearing block arrangement and fixed in the one of the channels, the latch plate being formed with a series of vertically spaced apart slots defining different vertical adjustment positions for the bezel and the cage relative to the upper end of the one of the channels;
  a height adjustment frame extending downwardly from the cage;
  a release member pivotally mounted within the cage and constructed with a latching tooth which is selectively engageable and disengageable with the one of the slots in the latch plate;
  a first spring engaged with and biased against the release member for normally urging the tooth into latching engagement with the one of the slots in the latch plate to lock the cage and bezel at a desired vertical position relative to the upper end of the one of the channels; and
  a second spring having one end connected to the bearing block arrangement and another end secured to the height adjustment frame for normally providing an upward force on the cage and the bezel,
  wherein moving the release handle upwardly against the bias of the first spring pivots the release handle and disengages the tooth from the one of the slots enabling the height adjustment frame, the release member, the cage and the bezel to be moved vertically assisted by the upward force of the second spring to another position relative to the upper end of the one of the channels as defined by another one of the slots in the latch plate, and
  wherein releasing the release handle causes a return force of the first spring biased against the release member to pivot the release handle so that the tooth on the release member is urged into latching engagement with the other of the slots in the latch plate thereby maintaining the vertical positioning, of the cage and bezel relative to the upper end of the one of the channels.

19. The adjustment arrangement of claim 18, wherein the seat belt webbing is secured at both ends to a frame member with at least one end being routed through a spring biased retractor.

* * * * *